United States Patent [19]

Rogers

[11] 4,031,173

[45] June 21, 1977

[54] EFFICIENCY AND UTILIZATION OF COOLING TOWERS

[76] Inventor: Paul Rogers, 1801 Century Park East, Los Angeles, Calif. 90067

[22] Filed: Mar. 25, 1976

[21] Appl. No.: 670,122

[52] U.S. Cl. ..................................... 261/24; 98/58; 165/DIG. 1; 261/DIG. 11; 290/55; 415/2
[51] Int. Cl.² ...................... F03D 9/00; F23L 17/02
[58] Field of Search ...................... 261/DIG. 11, 24; 415/2–4, 164; 416/111, 119, 197 A, DIG. 4; 98/58; 165/DIG. 1; 290/44, 55

[56] References Cited

UNITED STATES PATENTS

| 3,721,290 | 3/1973 | Butler, Jr. | 261/DIG. 11 |
| 3,936,652 | 2/1976 | Levine | 290/55 |

FOREIGN PATENTS OR APPLICATIONS

| 1,231,581 | 5/1971 | United Kingdom | 415/183 |

Primary Examiner—Tim R. Miles
Assistant Examiner—Gregory N. Clements
Attorney, Agent, or Firm—Herzig & Walsh Incorporated

[57] ABSTRACT

The invention relates to cooling towers of the type currently in use for cooling water and/or condensing exhaust steam as for example in association with nuclear or fossil fuel type power plants. Typically towers are very large and very high. The invention embodies an original concept for utilization of such towers, for example hyperbolic towers, for the generation of energy from wind and also for improving the efficiency of the cooling tower. In the exemplary form of the invention a large wind driven rotor is provided to be carried by the tower and to rotate around its axis at the position of the narrowed throat of the tower. Pressure is generated by the rotor and discharged through nozzles arrayed on the inside of the walls of the tower to augment and enhance the draft within the tower.

7 Claims, 5 Drawing Figures

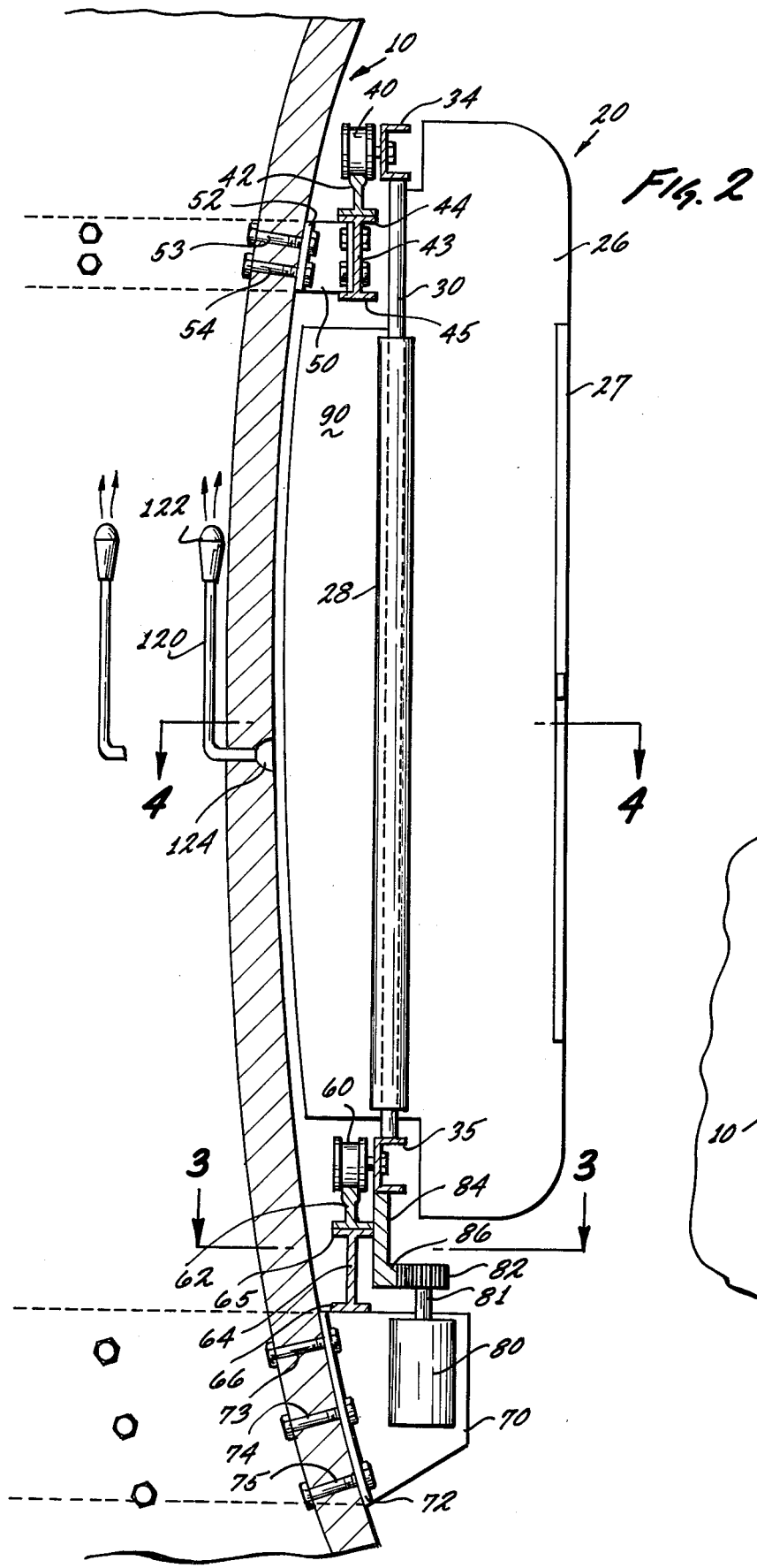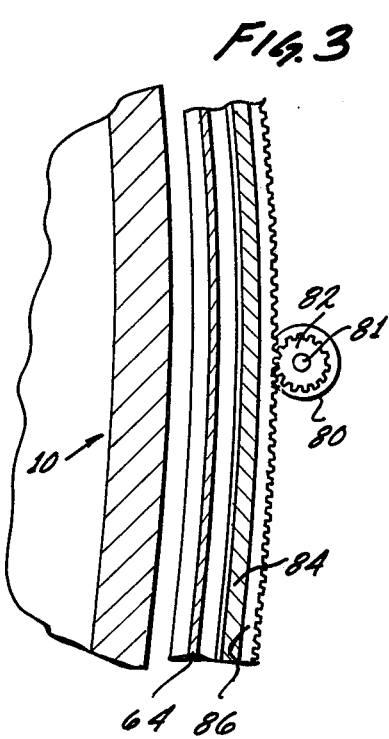

EFFICIENCY AND UTILIZATION OF COOLING TOWERS

BACKGROUND OF THE INVENTION

1. Field of the Invention

The field of the invention firstly is that of originating or creating new sources of power or energy. This aspect of the invention is directly related to cooling towers as apparently utilized as for example in association with power plants as referred to in the abstract. Additionally, the field of the invention is that of improvements in the efficiency of such cooling towers as will be dealt with more specifically hereinafter.

2. Description of the Prior Art

It is, of course, well known that windmills and wind driven generators are common to the prior art. Nevertheless, it is common knowledge currently that new sources of energy or new adaptations for producing energy are very urgently in demand and in need for reasons that are well known. Energy shortages in all areas in which energy has conventionally been derived are foreseen. These areas, of course, including those wherein energy is derived from petroleum products, fossil fuels, natural gas, nuclear power, as well as water power. Energy can, of course, not be created. What the prior art offers in the way of sources of energy is limited and subject to other drawbacks, all of which have been fairly dealt with in the literature. Accordingly, any new adaptations are unique in relation to the prior art and become significant. The concept or adaptation of the herein invention as described in detail hereinafter is in this category.

SUMMARY OF THE INVENTION

The invention in its exemplary form is directly related to cooling towers of types that have been referred to in the foregoing. Typically cooling towers of the types referred to, as conventionally associated with power plants such as nuclear or fossil fuel power plants, are extremely large, tall, and expensive structures each requiring millions of dollars to build. Their heights may exceed 500 feet.

The herein invention embodies the original concept and discovery that utilization can be made of such existing towers for the generation of energy from wind forces. Related to the matter of generation of energy utilizing the towers is the concept and discovery of means for improving the efficiency of the towers as will be dealt with more in detail hereinafter.

Typically cooling towers of the type referred to may be hyperbolic in cross-sectional contour. The invention provides for a wind driven rotor which is carried by the tower and rotates about its vertical axis preferably at a position which is at or adjacent the restricted hyperbolic throat of the tower. A number of factors involved and related to the adaptation of the invention for generating energy are very significant. The towers are large and tall, thus being readily capable of supporting the rotor which is driven by the wind and at an elevation such that very substantial amounts of energy can be extracted from the large rotor driven by the wind. The capital outlay for an installation is, of course, minimized since the tower itself already exists and the rotor itself is of relatively simple construction. It is estimated that an installation of the type being referred to could generate several thousand kilowatts of power.

Cooling towers of the type referred to have come into existance because of the needs for large volumes of water necessary in the operation of power plants, nuclear and fossil fuel types. Because of the immense size of the towers even a very small percentage increase in efficiency of a tower would represent a very substantial improvement in terms of cost efficiencies for the plant as a whole. The herein invention provides adaptations and means for realizing such improvements in efficiency of the cooling tower. In the exemplary form of the invention this result is realized by way of utilizing a wind driven rotor to produce pressurized air; then discharging this air upwardly through nozzles arrayed within the inside walls of the tower so as to augment and increase the natural draft within the tower and to thereby improve and increase the efficiency.

In the light of the foregoing, the primary object of the invention is to provide and realize an effective energy source by way of a wind driven rotor supported and carried by a cooling tower at an elevated position to rotate about the vertical axis of the tower.

A further object of the invention is to realize a system wherein the cooling tower has a hyperbolic contour with the rotor supported substantially at the narrowed neck of the tower.

A further object is to provide a rotor embodying adjustable vane means with automatic means for adjusting the vane positions in accordance with wind velocity.

A further object is to provide electrical generating means driven by the rotor.

A further object is to provide means whereby the rotor generates air pressure with jet discharge means arranged within the tower for discharging air vertically to augment and enhance the natural draft.

Further objects and additional advantages of the invention will become apparent from the following detailed description and annexed drawings.

BRIEF DESCRIPTION OF THE DRAWINGS

FIG. 2 is an enlarged sectional schematic view taken through a side wall of the tower and illustrating the construction of the rotor and its mountings;

FIG. 3 is a partial sectional view taken along the line 3—3 of FIG. 2;

DESCRIPTION OF THE PREFERRED EMBODIMENT

Figure 1:
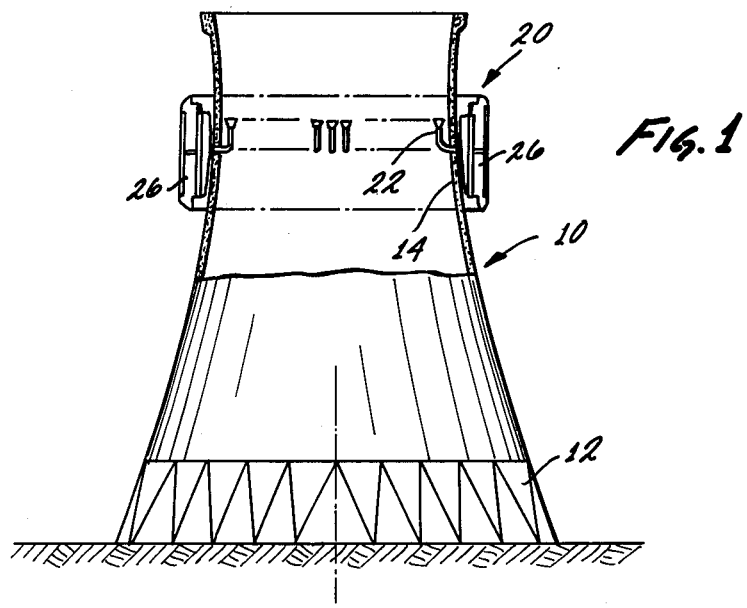
FIG. 1 is a schematic view of a cooling tower having the invention associated therewith.

Numeral 10 in FIG. 1 designates a schematic showing a typical cooling tower of the type previously referred to herein. Typically, these towers are very large, high and expensive as previously stated. It has a base schematically shown at 12. Typically, water to be cooled is pumped in at the base of the tower and discharged over a lattice work with there being an upward draft of air for evaporating and cooling the water.

As shown, the tower is hyperbolic in contour having a narrowed throat part as designated by the numeral 14. Numeral 20 designates a wind driven rotor which is mounted to be rotatable about the vertical axis of the tower substantially at the position of the narrowed throat. Numeral 22 designates an array of upwardly directed nozzles which are positioned inside of the tower adjacent to the inside walls as shown. The purpose of the nozzles is to discharge upwardly directed jets of air for purposes of increasing and augmenting the upward draft within the tower and thereby improving the efficiency.

FIGS. 2–5 show further details of the rotor and the manner in which it is mounted to rotate around the vertical axis of the tower. The figures show an exemplary form of construction. The rotor is constructed to provide a plurality of curved vanes one of which is designed at 26 in FIG. 2. The vane 26 is carried on a vertical tube 28 which is journaled on a vertical stem 30. Vane 26 has a stiffening tube 27 at its edge. Numeral 34 designates an upper circular support ring which is U-shaped in cross-section as shown. Numeral 35 designates a lower circular support ring which is U-shaped in cross-section also. The rod 30 is carried between the support rings 34 and 35.

The upper and lower support rings carry grooved rollers or flanged wheels which ride on circular trackways provided around the outside of tower 10. Numeral 40 designates one of the grooved rollers or wheels carried by upper support ring 34 and it rides on circular track or trackway 42. The trackway 42 is in the shape of an I-beam as shown which is supported on a further flanged beam 43, which has upper and lower flanges 44 and 45 as shown. The beam 43 is supported from the side wall of the tower 10 by way of a bracket 50 which is bolted to the beam and which has a flange 52 secured to the tower 10 by bolts 53 and 54.

The mounting of the rotor as shown and described is exemplary and could take other equivalent forms. The rollers or flanged wheels could be journalled on roller bearings and of course the system could be made more elaborate in other ways to minimize friction.

Numeral 60 indicates one of the grooved rollers or wheels carried on the lower support ring 35 and it rides on a track 62 having the shape of an I-beam. The track 62 is supported on a further beam 64 having upper and lower flanges 65 and 66 as shown. The beam 64 is supported on a bracket 70 having a flange 72 and is secured to the wall of the tower 10 by bolts 73, 74 and 75.

Supported on the bracket 70 is an electrical generator 80 having a shaft 81 on the end of which is a spur gear 82. Carried by the support ring 35 is a further ring 84 at the lower part of which is a large gear 86 that meshes with the gear 82 for purposes of driving the generator 80 for generating electrical power.

Figures 4, 5:
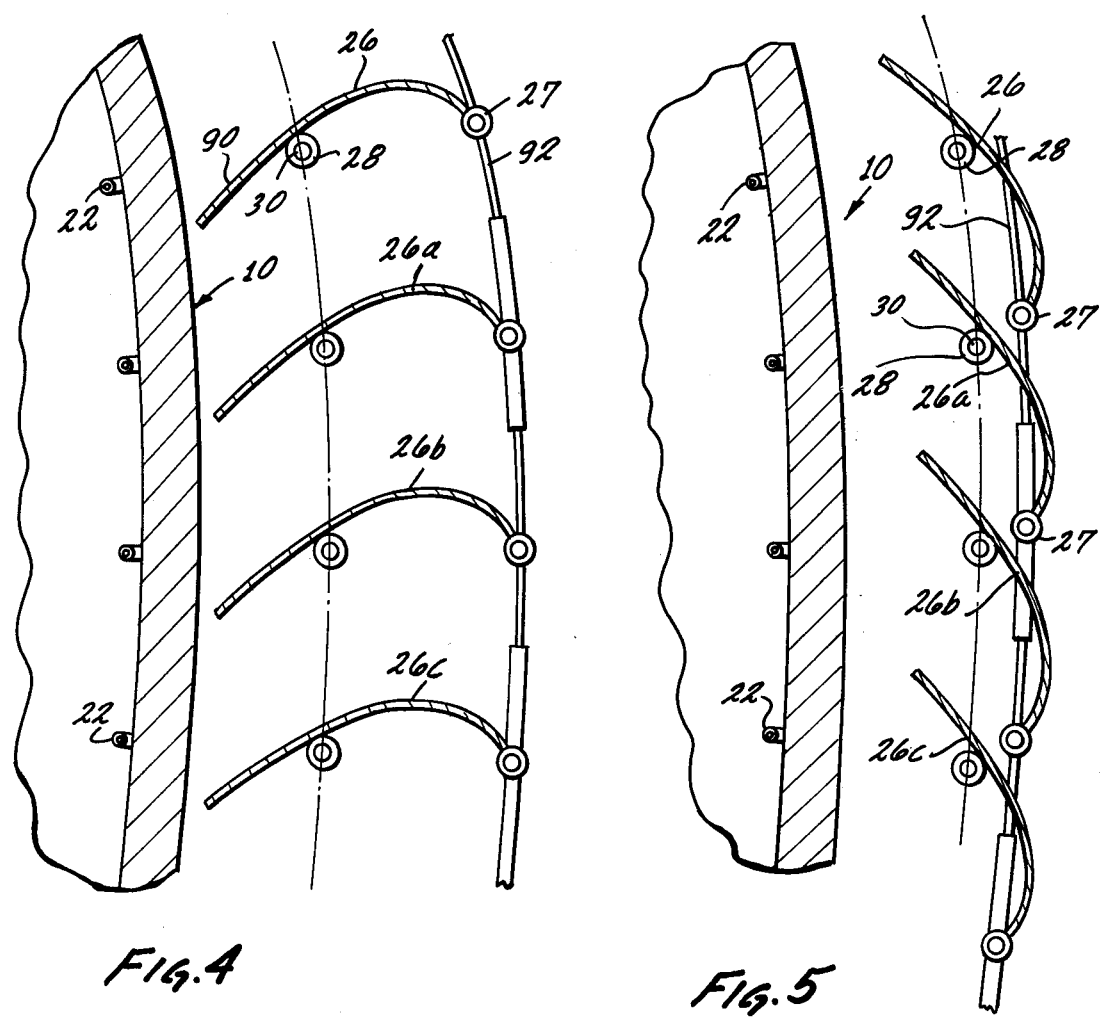
FIG. 4 is a partial detail view showing the rotor vanes in one position.
FIG. 5 is a view similar to FIG. 4 showing the rotor vanes in another position.

The vane 26 is of curved construction as may be seen in FIGS. 4 and 5 having a portion 90 which extends inwardly with respect to the tube 28 to a position adjacent to the wall of the tower 10. All of the group of vanes 26 and 26a, b, and c are of similar construction. The outer edges of the group of vanes 26 are connected by a connector or control member 92.

As shown the vanes can be adjusted between open and closed positions as shown in FIGS. 4 and 5. Control member 92 connects to a group of vanes and can be activated to adjust the vanes. Several of the members 92 may be provided and they can be activated in various ways. For example, a governor may be provided with connections to the vanes to adjust them in accordance with governor speed.

As stated, the inner portion of the vane 26 as designated at 90 rotates adjacent to the wall of the tower 10. This generates a positive pressure in this area of the throat of the tower. Numeral 120 designates a tube having an upwardly directed jet 22 at its end adjacent to the wall of the tower and its inner end connecting to an orifice 124 adjacent to the inner edges of the vanes as illustrated. Thus, the positive pressure adjacent to the side wall of the rotor is directed through the upwardly directed jet nozzles to augment and enhance the upward draft within the tower. In a typical construction, these jets might be five feet apart around the internal circumference of the tower.

From the foregoing, those skilled in the art will understand and appreciate the nature and construction of the invention and its utility and the manner in which all of the objectives as set forth in the foregoing are realized. Typically, the tower is constructed of reinforced concrete and is very high so as to be capable of readily supporting a large rotor. The rotor is susceptible to being driven by the wind irrespective of the direction of the wind and because of its size very substantial amounts of energy can be produced such as, for example, on the order of several thousands of kilowatts. Thus, the order of magnitude of the energy which it is possible to produce is very significant considering the contemporary needs for new energy sources.

In addition to the generation of energy, a further advance and improvement is realized of enhancing the efficiency of the tower by providing for the upwardly directed jets to increase the draft. As previously pointed out, even a very small increment of increase in efficiency in the tower because of its size will result in very substantial economies in overall operation of the system.

The foregoing disclosure is representative of the preferred exemplary form of the invention and is to be interpreted in an illustrative rather than a limiting sense, the invention to be accorded the full scope of the claims appended hereto.

What is claimed is:

1. In a structure of the character described in combination, a cooling tower of the type in which a vertical draft of air is produced for purposes of cooling water for condensing exhaust steam, means comprising a rotor carried by the tower at an elevated position and means whereby the rotor rotates around the vertical axis of the tower on the exterior thereof and is exposed to wind, the rotor being constructed whereby it is caused to rotate by prevailing winds, and means for transforming energy generated by rotation of the rotor.

2. Apparatus as in claim 1 wherein the tower is hyperbolic in contour having an upper portion of reduced diameter, said rotor being mounted substantially at said reduced diameter.

3. Apparatus as in claim 1 including circular trackway means surrounding the cooling tower and the said rotor having wheel means constructed to travel on the trackway means.

4. Apparatus as in claim 1 wherein the said rotor comprises a plurality of vane means having mounting means whereby the vanes are adjustable in orientation with respect to the adjacent surface of the tower and means providing for relative adjustment of the vanes.

5. Apparatus as in claim 1, including electrical generator means connected to be driven by said rotor.

6. In a structure of the character described in combination, a cooling tower of the type in which a vertical draft of air is produced for purposes of cooling water for condensing exhaust steam, means comprising a rotor carried by the tower at an elevated position and means whereby the rotor rotates around the vertical axis of the tower and is exposed to wind, the rotor being constructed whereby it is caused to rotate by prevailing winds, means for transforming energy generated by rotation of the rotor, and means whereby a positive air pressure is generated by said rotor providing pressurized air and means for producing an upward flow of said pressurized air within the walls of the tower in a manner whereby to enhance the draft therein.

7. Apparatus as in claim 6 wherein said means for producing the upward flow of pressurized air includes a plurality of nozzle means arrayed on the inside of the walls of the tower.

* * * * *